United States Patent [19]

Pool

[11] Patent Number: 4,567,795
[45] Date of Patent: Feb. 4, 1986

[54] SLOT CUTTING APPARATUS

[76] Inventor: James R. Pool, 402 Colorado St., Athens, Tex. 75751

[21] Appl. No.: 605,150

[22] Filed: Apr. 30, 1984

[51] Int. Cl.$^4$ .............................................. B26D 3/16
[52] U.S. Cl. ........................................ 83/17; 83/176; 83/490; 83/491
[58] Field of Search ..................................... 83/17–20, 83/54, 175, 176, 465, 466.1, 490, 409, 491

[56] References Cited

U.S. PATENT DOCUMENTS

| | | | |
|---|---|---|---|
| 2,629,164 | 2/1953 | Pridy | 83/54 X |
| 2,738,841 | 3/1956 | Jones | 83/465 X |
| 2,925,005 | 2/1960 | Hensley | 83/176 |
| 3,066,564 | 12/1962 | Carpenter | 83/175 |
| 3,232,159 | 2/1966 | Stanley | 83/175 |
| 3,831,470 | 8/1974 | Maroschak | 83/54 X |
| 3,978,747 | 9/1976 | Lyon | 83/18 |
| 4,050,975 | 9/1977 | Draffone | 83/176 X |
| 4,082,025 | 4/1978 | Reinbacher | 83/411 R |
| 4,112,810 | 9/1978 | Dreibelbis | 83/490 |

FOREIGN PATENT DOCUMENTS 2363938  5/1975  Fed. Rep. of Germany .......... 83/54

Primary Examiner—James M. Meister
Attorney, Agent, or Firm—Jerry W. Mills; Gregory M. Howison

[57] ABSTRACT

A tube slotting apparatus (10) includes a base (12) upon which a polyvinyl chloride tube (86) is disposed. The tube (86) is mounted over a convex surface (71) to allow bowing thereof. A tensioning apparatus (52) presses the tube (86) against the convex surface such that the upper surface thereof is tensioned and the lower surface thereof is in compression. A plurality of saw blades (70) are mounted on a pivoting bracket (72) to provide cutting of the slots in the tube (86). Rotation of the saw blades (70) on to the tensioned surface of the polyvinyl chloride tube (86) results in the formation of slots. The saw blades (70) are rotated in the opposite direction to the cutting teeth and the portion of the polyvinyl chloride tube (86) disposed between the two saw blades during formation of the slots pulls away from the surface of the saw blades such that binding is prevented.

12 Claims, 6 Drawing Figures

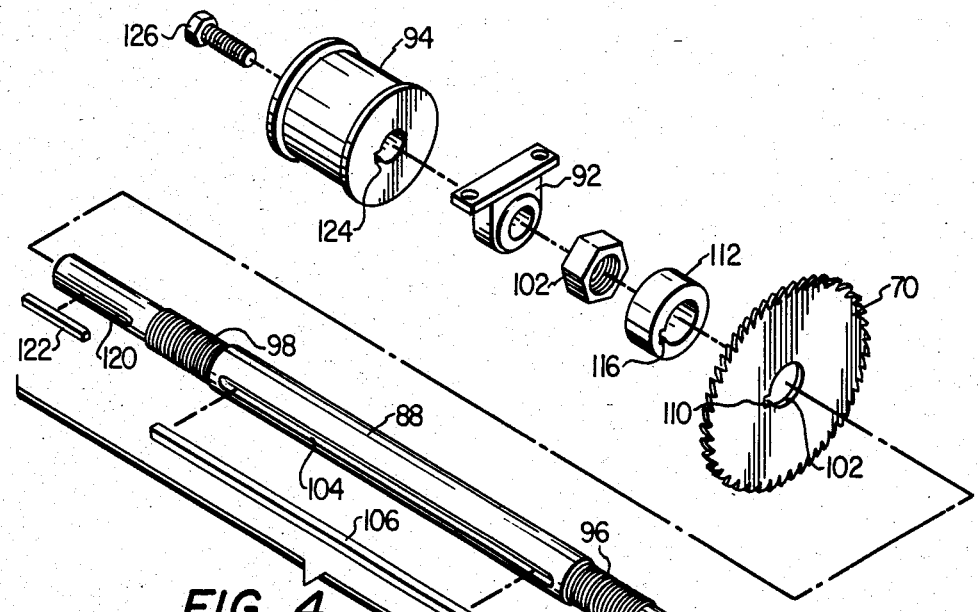
FIG. 4
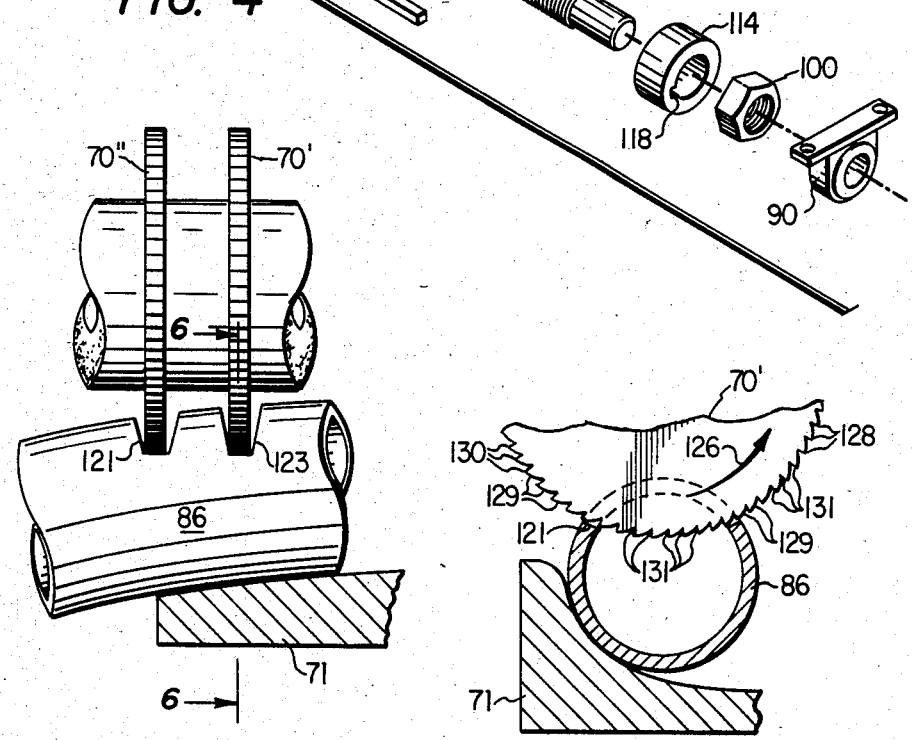
FIG. 5
FIG. 6

SLOT CUTTING APPARATUS

TECHNICAL FIELD OF THE INVENTION

The present invention pertains in general to well screens for use in wells and, more particularly, to an apparatus for cutting slots in a pipe to form the well screen.

BACKGROUND OF THE INVENTION

During well construction procedures, it is desirable to provide a filter to prevent particulate matter from the producing formation from entering the well with the produced fluids. To filter out this particulate matter, well screens are utilized which are commonly comprised of some form of slotted pipe. The size of the particulate matter excluded from flow therethrough depends upon the size of the slots. In addition to the size of the slots determining the size of the particulate matter allowed to flow therethrough, the number of slots determines the flow rate therethrough.

Fabrication of well screen commonly utilizes pipe formed from such easily formed flexible manmade materials as polyvinyl chloride, teflon and polyethelene. In order to form the slots therein, a rotary saw blade is utilized. The pipe is placed on a conveyor platform and passed under the saw blade. However, there are a number of disadvantages with utilizing a rotary saw blade with such flexible pipe. One of these disadvantages is that contact of the side of the blade with the pipe may cause binding and heating action which can cause the pipe to melt at the sawing point and result in the formation of excessively oversized and irregularly shaped slots. In addition, the cuttings resulting from passing the rotary saw blade through the pipe to form the slot have a tendency to collect on the blade surface and in the teeth of the blade. The increased friction and "binding" resulting from this packing of the slot with cuttings can cause the blade to wear out quickly.

In order to reduce the binding, a number of techniques have been utilized for cutting such materials as pipe. For example, U.S. Pat. No. 3,232,159 issued to J. H. Stanley and U.S. Pat. No. 3,066,564 issued to R. H. Carpenter both disclose the use of a mechanism for bending hose slightly such that a longitudinal strain is placed on the material to prevent binding of a single saw blade. U.S. Pat. No. 3,978,747 issued to Lyon, discloses a similar method whereby tension is continuously maintained on the surface of a tubular article being cut by progressively bending the tubular article as it is passed through a cutting blade until the device is fully severed. All of the above devices utilize relatively complicated mechanisms for bending the pipe and provide for severing of the pipe rather than slotting the pipe. Slotting, as opposed to severing of pipe, requires some form of control over both the dimension between adjacent slots and also the dimension of the slot width itself.

In view of the above disadvantages, there exists a need for a tube slotting apparatus that forms slots in a flexible tube and provides for both low cost and high efficiency operation.

SUMMARY OF THE INVENTION

The present invention disclosed and claimed herein comprises a slot cutting apparatus for cutting a plurality of transverse slots in a length of flexible tubing. The slot cutting apparatus includes a device for holding the tubing on a platform and a tensioning apparatus for bowing the tube on the surface of the platform. A plurality of rotary saw blades are disposed on a support over the tube and mounted on a common shaft and co-rotatable therewith. A motor is also disposed on the support rotating the shaft. The support is pivotable such that the saw blade can be brought into contact with the upper surface of the tube. Due to the bowing, the upper surface thereof is tensioned and the lower surface thereof is in compression. The portion of the tensioned surface between adjacent ones of the saw blades assumes its original conformation upon forming of the slots such that the tubing material is simultaneously pulled away from adjacent ones of the saw blades to prevent binding thereof.

In yet another embodiment of the present invention, each of the saw blades has a plurality of cutting teeth disposed on the periphery thereof. Each of the cutting teeth is configured in a swept forward configuration. The saw blades are rotated in a direction opposite to the swept forward configuration.

BRIEF DESCRIPTION OF THE DRAWINGS

For a more complete understanding of the present invention and the advantages thereof, reference is now made to the following description taken in conjunction with the accompanying Drawings in which:

FIG. 4 illustrates an exploded view of one of the rotary saw blades utilized to form the slots of the pipe;

FIG. 5 illustrates a detail of two adjacent saw blades forming the slots in the PVC pipe; and FIG. 6 illustrates a cross sectional view taken along lines 6—6 of FIG. 5.

DETAILED DESCRIPTION OF THE INVENTION

Figure 1:
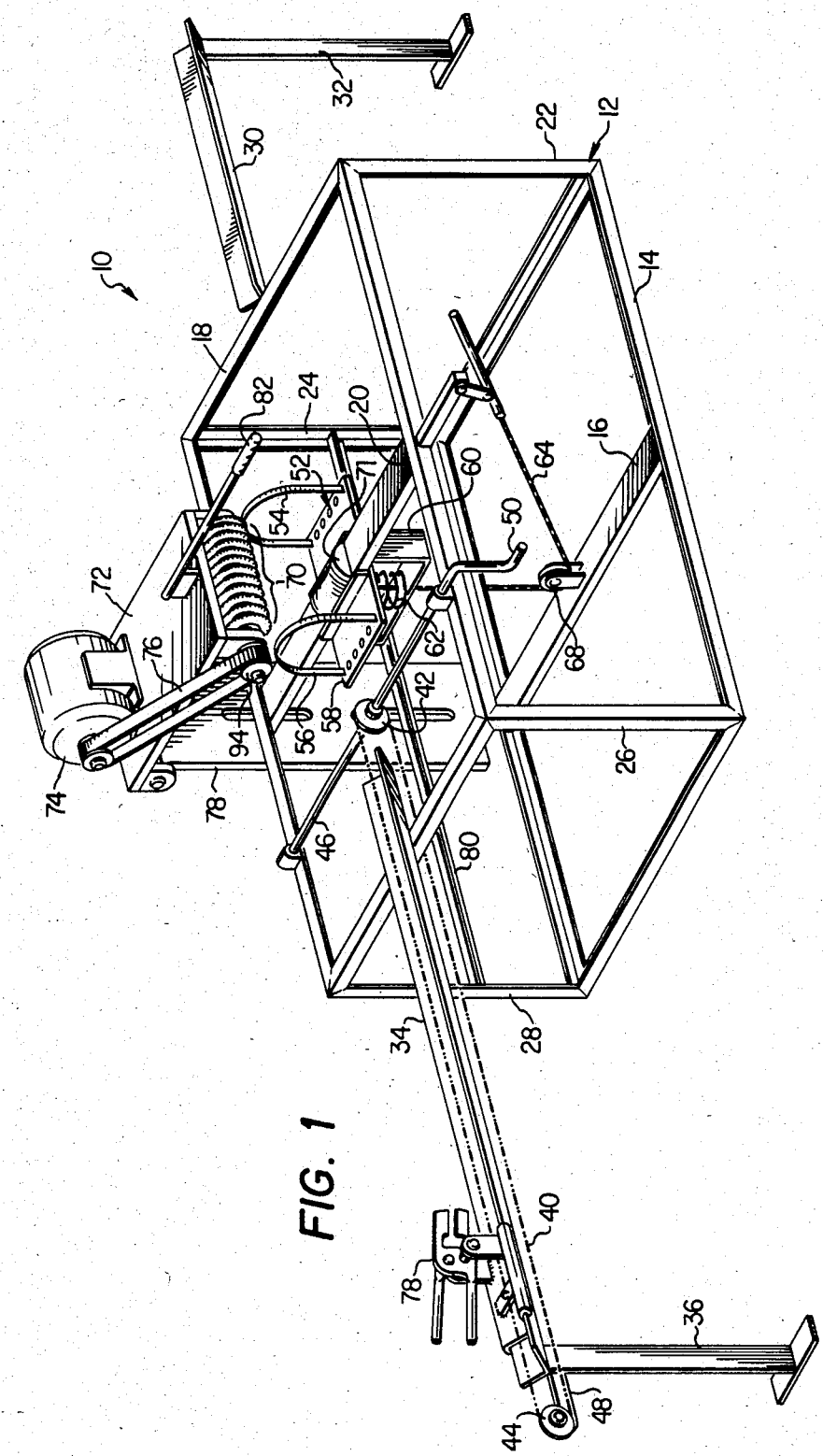
FIG. 1 illustrates a perspective view of a slot cutting apparatus in accordance with the present invention.

Referring now to FIG. 1, there is illustrated a perspective view of a slot cutting apparatus 10 of the present invention. The slot cutting apparatus 10 includes a platform 12 which includes a rectangular base 14 formed of angle iron and a center reinforcing member 16 disposed between and perpendicular to the longest sides of the rectangular base 14. The platform 12 also includes an upper rectangular surface 18 which is also formed of angle iron and has a support member 20 disposed between and perpendicular to the two longest sides thereof. The platform 12 has four vertical supports 22, 24, 26 and 28 connected between the corners of the rectangular base 14 and the upper rectangular surface 18.

A V-shaped tubing guide 30 is disposed at one end of the platform 12 and supported at one end thereof on the upper surface 18 and at the other end thereof with a vertical support member 32. A V-shaped tubing guide 34 is disposed at the other end of the platform 12 and has one end thereof supported on the upper surface 18 of the platform 12 and the other end thereof supported with a vertical support member 36. The tubing guides 30 and 34 are oriented such that a length of flexible tubing can be disposed across the upper surface 18 with the ends thereof supported by the tubing guides 30 and 34. In the preferred embodiment, polyvinyl chloride (PVC) tubing is utilized. However, it should be understood that any flexible pipe can be utilized.

A clamping member 38 is slideably disposed on the tubing guide 34 and is operable to clamp on the lower edge of the end of a length of PVC tubing to prevent rotation of it with respect to the tubing guide 34. Clamping on the lower edge of a tube allows various sizes of tubing to be held as desired utilizing the same clamping member 38. A chain 40 is attached to the clamping member 38 and passes through the trough portion of the tubing guide 34 and over a sprocket 42. The chain then passes around the sprocket 42 and under the tubing guide 34 to a sprocket 44. The chain is then connected at the other end thereof to the clamping member 38 such that a continuous chain loop is formed. The sprocket 42 is rotatably mounted on an axle 46 attached to opposite sides of the upper surface 18 of the platform 12 and the sprocket 44 is attached to a supporting bracket 48 which is supported on the vertical support member 36. The axle 46 is rotated with a hand crank 50 to facilitate movement of the PVC pipe (not shown) that is disposed on the tubing guides 30 and 34.

Figure 2:
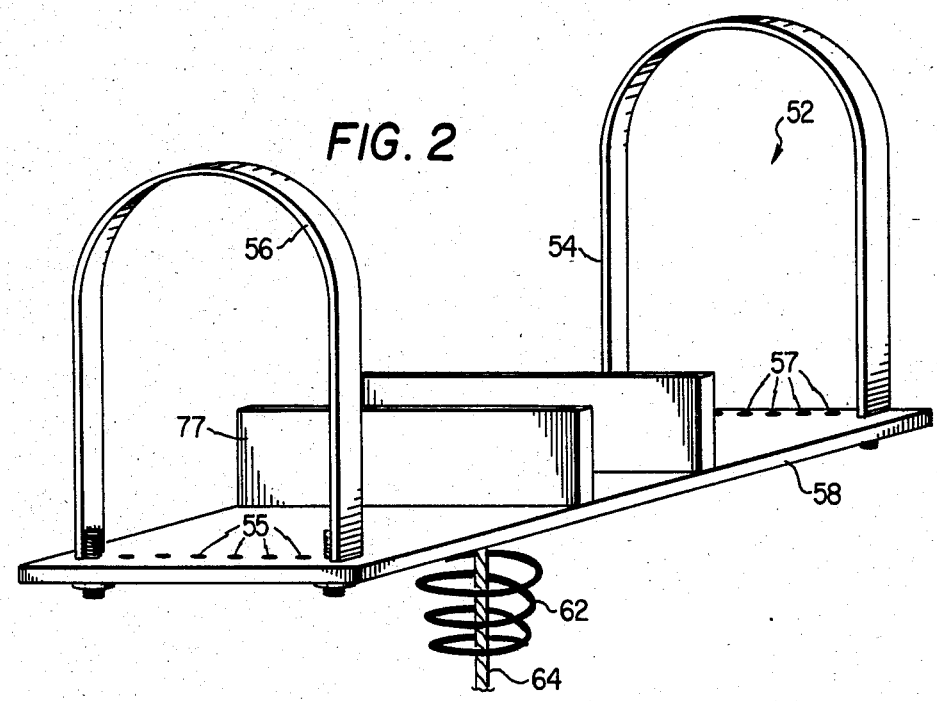
FIG. 2 illustrates a perspective view of the pipe clamping apparatus for holding the pipe and maintaining tension on the surface thereof.

A tensioning apparatus 52 is disposed about the support member 20 and is movable with respect therewith. The clamping mechanism 52 has a clamping loop 54 and a clamping loop 56 disposed on either side of the support member 20 and attached to a base 58. The clamping loops are best illustrated in FIG. 2 and are dimensioned to fit various sizes of PVC pipe. The clamping loops 54 and 56 have the ends thereof secured in sizing holes 55 and 57, respectively.

A U-shaped bracket 60 is disposed under the base 58 and attached at either end thereof to the support member 20. A spring 62 is disposed between the U-shaped bracket 60 and the base 58 to hold the base 58 against the lower surface of the support member 20. A cable 64 has one end thereof attached to the base 58 and the other end thereof attached to a lever activated tensioning device 66. The cable 64 passes through a pulley 68 that is attached to the cross member 16 on the base 14. The cable 64 is operable to reciprocate the clamping mechanism 52 downward.

A saddle shaped member 71 is disposed on the upper surface of the support member 20 and between the clamping loops 54 and 56. The saddle shaped member 71 is operable to provide an arcuate surface along the longitudinal direction of a length of pipe laid between the tubing guides 30 and 34 and to provide a concave surface perpendicular to the longitudinal axis of the pipe. As will be described hereinbelow, reciprocation downward of the clamping device 52 causes the pipe to be placed in tension across the surface of the saddle shaped member 71.

A plurality of rotary saw blades 70 are rotatably mounted on the end of a support bracket 72. A motor 74 is mounted on the other end of the support bracket 72 and connected to the rotary saw blades 70 through a belt drive system 76. The support bracket 72 is pivotably mounted on the end of a vertical sliding support bracket 78. The vertical support bracket 78 is slideably attached to one side of the upper surface 18 and to a cross member 80 that is attached between the vertical supports 24 and 28. The sliding vertical support member 78 can have the height thereof adjusted such that the pivot point for the support bracket 72 is movable. A fixed lever 82 is attached to the support bracket 72 proximate the rotary saw blades 70 such that raising and lowering of the end of the support bracket 72 is facilitated.

Figure 3:
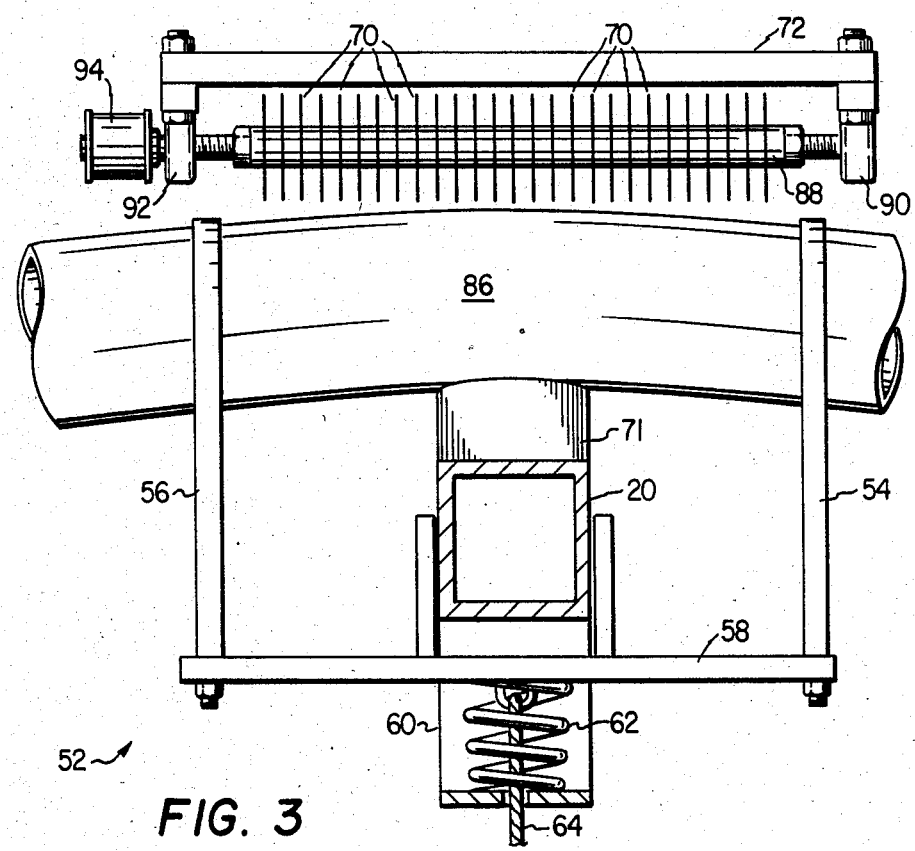
FIG. 3 illustrates a side view of the pipe clamping apparatus with the length of pipe held in place for forming slots therein.

Referring now to FIG. 3, there is illustrated a side view of a portion of the apparatus 10 with a PVC tube 86 disposed across the saddle shaped member 71 and pressed against the convex surface thereof by the tensioning apparatus 52. The PVC tube 86 is tensioned such that a slight "bowing" results. This bowing is not of a sufficient magnitude to distort the cross sectional shape of the PVC tube 86 but, rather, it places a surface tension along the longitudinal axis thereof, as will be described hereinbelow.

Referring now to FIG. 4, there is illustrated an exploaded view of the saw blades 70 and the method for mounting thereof, wherein like numerals refer to like parts in the various FIGURES. The plurality of rotary saw blades 70, of which only one is illustrated, are mounted on a shaft 88 which is rotated in a bushing 90 on one end thereof and a bushing 92 on the other end thereof. A pulley 94 is mounted on one end of the shaft 88 external to the busing 92. The pulley 94 is operable to receive the belt drive mechanism 76 that communicates with the motor 74. The shaft 88 has a threaded end 96 and a threaded end 98 for receiving securing nuts 100 and 102, respectively. The shaft 88 also has a transverse slot 104 located on the surface thereof for receiving a longitudinal key 106. Each of the saw blades 70 has a center cut-out 108 dimensioned to fit over the shaft 88 and a cut-out 110 for mating with the key 106. The cut-out 110 and the key 106 prevent rotation of the saw blade with respect to the shaft 88. Each of the saw blades 70 has a spacer 112 disposed on one side thereof and a spacer 114 disposed on the other side thereof. The spacers 112 and 114 are toroidal shaped with a cut-out 116 and a cut-out 118, respectively, disposed on the interior thereof for mating with the key 106. The cut-outs 116 and 118 prevent rotation of the spacers 112 and 114, respectively, with respect to the shaft 88 such that friction between the saw blade 70 and the spacers 112 and 114 is prevented. Each of the adjacent saw blades 70 has a spacer disposed therebetween, the spacer dimensioned according to the desired slot spacing on the finished slotted PVC pipe.

The shaft 88 has a slot 120 formed in the end thereof and oriented along the longitudinal axis in the portion thereof coordinating with the pulley 94. A key 122 is dimensioned to fit within the slot 120 and coordinate with a cut-out 124 in the pulley 94. The key 122 in conjunction with the slot 120 and the cut-out 124 prevent relative rotation of the pulley 94 with respect to the shaft 88. A bolt 126 secures the pulley on to the end of the shaft 88.

Referring now to FIG. 5, there is illustrated a frontal view of a saw blade 70' and 70" showing the process of cutting a slot 121 and a slot 123, respectively in the PVC pipe 86. The PVC pipe 86, as described above, is tensioned over the saddle shape member 71 by the tensioning apparatus 52 such that the upper surface of the PVC pipe 86 is placed in tension and the lower surface thereof is placed in compression. Since the cutting operation is performed on the tensioned surface, cutting therethrough results in separation or pulling away of the material from the saw blades 70' and 70". In this manner, contact with the sides of the blades can be minimized to reduce heating and subsequent "binding". By utilizing more than one blade and forming more than one cut simultaneously, the tension on the surface can be essentially reduced to zero on the portion between the two saw blades 70' and 70". If only one blade were utilized, the tension would remain on the upper surface of the pipe 86 on either side of the saw blade, thus resulting in a potential for warping of the pipe 86. By utilizing two or more saw blades, the portion between the saw blades returns to its normal shape, thus resulting in a more uniform slot.

Referring now to FIG. 6, there is illustrated a cross sectional diagram of the cutting blades 70' taken along lines 6—6 in FIG. 5. The saw blade 70' rotates in the direction illustrated by an arrow 126. The saw blade 70' has a plurality of cutting teeth 128 disposed around the periphery thereof. Each of the cutting teeth 128 has a cutting edge 130 and is generally of a saw-tooth shape with the a leading edge 131 and a trailing edge 129. Normally, the saw blade rotates in the direction of the leading edge 131 such that the cutting edges 130 bite into the material being cut. In operation of the present invention, the saw blade 70' is operated in the opposite rotational direction such that the trailing edge 129 "leads" and the leading edge 131 "trails". In this manner, the cutting edges 130 do not do the actual cutting but, rather, the abrasive action of the trailing edges on the PVC pipe 86 provide the cutting action. While the actual theory of operation is not understood, Applicant has made tests which illustrate that the cutting life of a given saw blade lasts longer when the blade is operated in this "opposite" direction. It is thought that the reverse operation prevents collection of debris between the teeth 128 since the edge 129 is now the leading edge rather than the edge 131.

The PVC pipe 86, shown in cross-section, is illustrated at a position on the concave surface of the saddle shaped member 71 that is higher than the lowest depression therein. By so positioning the pipe 86, the tensioned surface is disposed off angle with respect to the perpendicular formed between the rotational axis of the saw blade 70' and the surface of the support member 20. The compression surface of the pipe 86 is adjacent the surface of the saddle shaped number 71. Therefore, the portion of the surface of the pipe 86 first contacting the saw blade 70' during formation of the slot 122 is under less tension than the portion of the pipe 86 that the teeth 128 exit from. This facilitates increased separation of the PVC material away from the saw blade 70' proximate the exit point of the teeth 128 from the pipe 86.

In summary, there has been provided a slot cutting machine which utilizes a plurality of rotary saw blades that are simultaneously rotatable on the surface of a length of PVC pipe. The PVC pipe is disposed over a convex surface proximate the saw blades such that the upper surface thereof is tensioned and the lower surface thereof is placed in compression. In this manner, movement of the saw blade through the upper surface results in pulling away of the material therefrom. In the portion disposed between two adjacent saw blades, the tension is released such that no deformation of the slot results. In addition, the saw blade is rotated in the opposite direction from that which the saw blade was designed such that a slanted leading edge is presented to the material being cut. This results in longer life for the cutting surface and a reduced tendency to cut irregular shaped or oversized slots due to chip buildup in the cutting teeth.

Although the preferred embodiment has been described in detail, it should be understood that various changes, substitutions and alterations can be made therein without departing from the spirit and scope of the invention as defined by the appended claims.

What is claimed is:

1. A slot cutting apparatus for cutting a plurality of transverse slots in a length of flexible tubing, comprising:
    means for holding the tubing;
    means for bowing the tubing such that one surface thereof is placed in tension and the other surface diametrically opposite the tensioned surface is placed in compression;
    a plurality of rotary saw blades mounted on a common axis and spaced a predetermined distance apart;
    means for simultaneously rotating said rotary saw blades,
    each of said rotary saw blades comprised of a saw blade having a plurality of cutting teeth on the periphery thereof, each of said cutting teeth having a swept forward conformation such that the cutting edge is the leading edge of the swept forward conformation and said means for rotating said blades rotates in the reverse direction to said swept forward conformation; and
    means for engaging said rotating saw blades with the tensioned surface of the tubing and perpendicular to the longitudinal axis thereof;
    the portion of the tensioned surface between adjacent ones of said rotary saw blades returning to the original surface state such that a well defined slot is formed and not effected by deformation of the tubing.

2. The apparatus of claim 1 wherein said means for bowing comprises:
    a stationary surface having a convex contour parallel to the longitudinal axis of the flexible tubing;
    first and second securing loops disposed about the flexible tubing on either side of said convex surface; and
    means for pulling said securing loops downward against the flexible tubing to force the flexible tubing against said convex surface for bowing thereof.

3. The apparatus of claim 2 wherein said stationary surface has a concave contour perpendicular to the longitudinal axis of the tubing, the tubing placed upon the concave surface above the lowest point thereof such that said saw blades enter the tubing at a lower surface tension than the exit point thereof.

4. The apparatus of claim 1 and further comprising means for moving the flexible tubing along the longitudinal axis thereof such that an uncut surface can be presented to said rotary saw blades for cutting slots therein.

5. The apparatus of claim 1 wherein said means for engaging comprises a support bracket having said rotary saw blades mounted on one end thereof and pivoted about a pivot point on the other end thereof such that said rotary saw blades pivot across the longitudinal axis of the flexible pipe to form cuts therein.

6. The apparatus of claim 1 wherein said means for rotating comprises a motor with a rotating shaft and means for coupling the rotational movement of the motor shaft to said rotary saw blades, said rotary saw blades mounted on a common shaft and co-rotatable therewith.

7. A slot cutting apparatus for cutting a plurality of slots in a flexible tube, comprising:
    a base for supporting the tube;

means for positioning the tube on said base;
means for bowing the tube at a selected position with respect to the upper surface of said base such that the upper surface of the tube is tensioned and the lower surface adjacent said base is in compression;
a saw support pivoted at a point on said base, said support adjustable to accommodate tubes of various diameters;
a plurality of rotary saw blades mounted on an axle on the end of said saw support diametrically opposite said pivot point, said shaft parallel to the longitudinal axis of the tube such that pivoting of said support at said pivot point results in said rotary saw blades contacting the tension surface of the tube;
means for rotating said shaft such that all of said rotary saw blades rotate in unison; and
means for pivoting said saw support such that said saw blades contact the tube;
said means for bowing comprising:
a support member having a convex surface aligned with the longitudinal axis of the tube and the rotating axis of said rotating means, and
means for conforming the tube to said convex surface such that it is uniformly bowed at the area where said saw blades contact the surface of the tube where the greatest surface tension is formed,
said convex surface having a convex profile parallel to the longitudinal axis of the tube and a concave profile perpendicular thereto, the tube placed upon the concave surface above the lowest point thereof such that said saw blades enter the tube at a lower surface tension than the exit point thereof;
said saw blades disposed a predetermined distance apart such that slots having a width equal to the width of said saw blades are spaced apart said predetermined distance;
the portion of the tube between two adjacent ones of said saw blades resuming original conformation as said saw blades form the slots such that the tube material is pulled away from both of said adjacent saw blades simultaneously.

8. A slot cutting apparatus for cutting a plurality of slots in a flexible tube, comprising:
a base for supporting the tube;
means for positioning the tube on said base;
means for bowing the tube at a selected position with respect to the upper surface of said base such that the upper surface of the tube is tensioned and the lower surface adjacent said base is in compression;
a saw support pivoted at a point on said base, said support adjustable to accommodate tubes of various diameters;
a plurality of rotary saw blades mounted on an axle on the end of said saw support diametrically opposite said pivot point, said shaft parallel to the longitudinal axis of the tube such that pivoting of said support at said pivot point results in said rotary saw blades contacting the tension surface of the tube;
means for rotating said shaft such that all of said rotary saw blades rotate in unison;
means for pivoting said saw support such that said saw blades contact the tube;
said saw blades disposed a predetermined distance apart such that slots having a width equal to the width of said saw blades are spaced apart said predetermined distance;
the portion of the tube between two adjacent ones of said saw blades resuming original conformation as said saw blades form the slots such that the tube material is pulled away from both of said adjacent saw blades simultaneously; and
means for moving the tube along its longitudinal axis with respect to said base wherein said means clamps to the lower edge of the end of the tube to accommodate tubes of various diameters.

9. A slot cutting apparatus for cutting a plurality of slots in a flexible tube, comprising:
a base for supporting the tube;
means for positioning the tube on said base;
means for bowing the tube at a selected position with respect to the upper surface of said base such that the upper surface of the tube is tensioned and the lower surface adjacent said base is in compression;
a saw support pivoted at a point on said base, said support adjustable to accommodate tubes of various diameters;
a plurality of rotary saw blades mounted on an axle on the end of said saw support diametrically opposite said pivot point, said shaft parallel to the longitudinal axis of the tube such that pivoting of said support at said pivot point results in said rotary saw blades contacting the tension surface of the tube;
means for rotating said shaft such that all of said rotary saw blades rotate in unison; and
means for pivoting said saw support such that said saw blades contact the tube;
said saw blades disposed a predetermined distance apart such that slots having a width equal to the width of said saw blades are spaced apart said predetermined distance;
the portion of the tube between two adjacent ones of said saw blades resuming original conformation as said saw blades form the slots such that the tube material is pulled away from both of said adjacent saw blades simultaneously;
each of said saw blades has a plurality of cutting teeth disposed on the periphery thereof, each of said cutting teeth having a swept forward configuration and said means for rotating rotates said saw blades in the opposite direction to said swept forward direction.

10. A method for forming slots in a polyvinyl chloride tube, comprising:
disposing a plurality of rotating saw blades on a shaft and spaced a predetermined distance apart;
disposing the polyvinyl chloride tube beneath the saw blade;
bowing the polyvinyl chloride tubing such that the upper surface thereof proximate the saw blades is tensioned and the surface diametrically opposite thereto is in compression;
rotating the saw blades such that all of the saw blades rotate in unison; and
pivoting the saw blades onto the tensioned surface of the polyvinyl chloride tube to form a slot therein having a width equal to the width of the saw blades and a spacing equal to the spacing between the saw blades;
the portion of the polyvinyl chloride tube between two adjacent ones of the saw blades returning to original conformation upon forming the slots such that they simultaneously withdraw from adjacent saw blades to prevent binding thereof;

each of the saw blades having a plurality of teeth formed on the periphery thereof for cutting, each of the teeth having a swept forward configuration, all of the blades rotated in a direction opposite to the swept forward configuration.

11. The method of claim 10 wherein the convex surface is parallel to the longitudinal axis of the tube and the contour of the convex surface perpendicular thereto is concave, the tube being positioned above the lowest point therein such that the saw blades enter the tube at a point with a lower surface tension than the exit point thereof.

12. A slot cutting apparatus for cutting a plurality of transverse slots in a length of flexible tubing, comprising:
   means for holding the tubing;
   a rotary saw blade disposed on a rotating axis;
   means for rotating said rotary saw blade;
   said rotary saw blade having a plurality of cutting teeth on the periphery thereof, each of said cutting teeth having a swept forward conformation such that the cutting edge is the leading edge of the swept forward conformation and said means for rotating said blades rotates in the reverse direction to said swept forward conformation; and
   means for engaging said rotating saw blade with the surface of the tubing and perpendicular to the longitudinal axis thereof.

* * * * *